(12) United States Patent
Zanzig et al.

(10) Patent No.: US 7,891,394 B2
(45) Date of Patent: Feb. 22, 2011

(54) TIRE WITH PUNCTURE RESISTANT SIDEWALL

(75) Inventors: David John Zanzig, Bertrange (LU); Jennifer Lyn Ryba, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 862 days.

(21) Appl. No.: 11/212,524

(22) Filed: Aug. 26, 2005

(65) Prior Publication Data

US 2006/0060284 A1   Mar. 23, 2006

Related U.S. Application Data

(60) Provisional application No. 60/612,541, filed on Sep. 23, 2004.

(51) Int. Cl.
*B60C 13/00* (2006.01)
(52) U.S. Cl. ........................ 152/525; 152/458
(58) Field of Classification Search ................ 152/524, 152/525, 458, 555, 564
See application file for complete search history.

(56) References Cited

U.S. PATENT DOCUMENTS

| | | | | | |
|---|---|---|---|---|---|
| 5,707,462 | A | * | 1/1998 | Kikuchi et al. | 152/525 |
| 6,046,266 | A | * | 4/2000 | Sandstrom et al. | 524/492 |
| 6,103,811 | A | * | 8/2000 | Midorikawa et al. | 524/495 |
| 6,127,468 | A | | 10/2000 | Cruse et al. | 524/225 |
| 6,204,339 | B1 | | 3/2001 | Waldman et al. | 525/350 |
| 6,414,061 | B1 | | 7/2002 | Cruse et al. | 524/262 |
| 6,528,673 | B2 | | 3/2003 | Cruse et al. | 556/427 |
| 6,608,125 | B2 | | 8/2003 | Cruse et al. | 524/262 |
| 2001/0020505 | A1 | * | 9/2001 | Zanzig et al. | 152/209.12 |
| 2001/0050134 | A1 | * | 12/2001 | Iizuka | 156/128.1 |
| 2002/0074077 | A1 | * | 6/2002 | Ikeda et al. | 156/123 |

FOREIGN PATENT DOCUMENTS

| | | |
|---|---|---|
| EP | 719662 | 7/1996 |
| EP | 922593 | 6/1999 |
| EP | 1000972 | 5/2000 |
| JP | 5286319 | 11/1993 |
| JP | 10-109506 A * | 4/1998 |

OTHER PUBLICATIONS

European Search Report, dated Oct. 31, 2005.

* cited by examiner

*Primary Examiner*—Geoffrey L Knable
(74) *Attorney, Agent, or Firm*—Henry C. Young, Jr.

(57) ABSTRACT

This invention relates to a pneumatic rubber tire having a puncture resistant rubber sidewall. The said tire sidewall is comprised of an outer, visible annular configured sidewall rubber layer and an inner (non-visible) annular configured sidewall rubber layer integral with and underlying said outer sidewall rubber layer, wherein said inner sidewall rubber layer contains a dispersion of short fibers, wherein said short fibers are substantially aligned in parallel relationship to each other and substantially parallel to the said annular configuration of said inner sidewall rubber layer. In a further aspect of the invention, said tire is comprised of a carcass which contains a rubber carcass ply comprised of a rubber encapsulated cord reinforcement of a plurality of cords wherein said cords are positioned in a radially disposed spaced apart substantially parallel relationship to each other, wherein said rubber carcass ply is integral with and underlies said inner rubber sidewall layer and wherein said short fibers of said inner rubber sidewall layer are substantially aligned in a perpendicular direction to said cords of said underlying carcass ply.

3 Claims, 1 Drawing Sheet

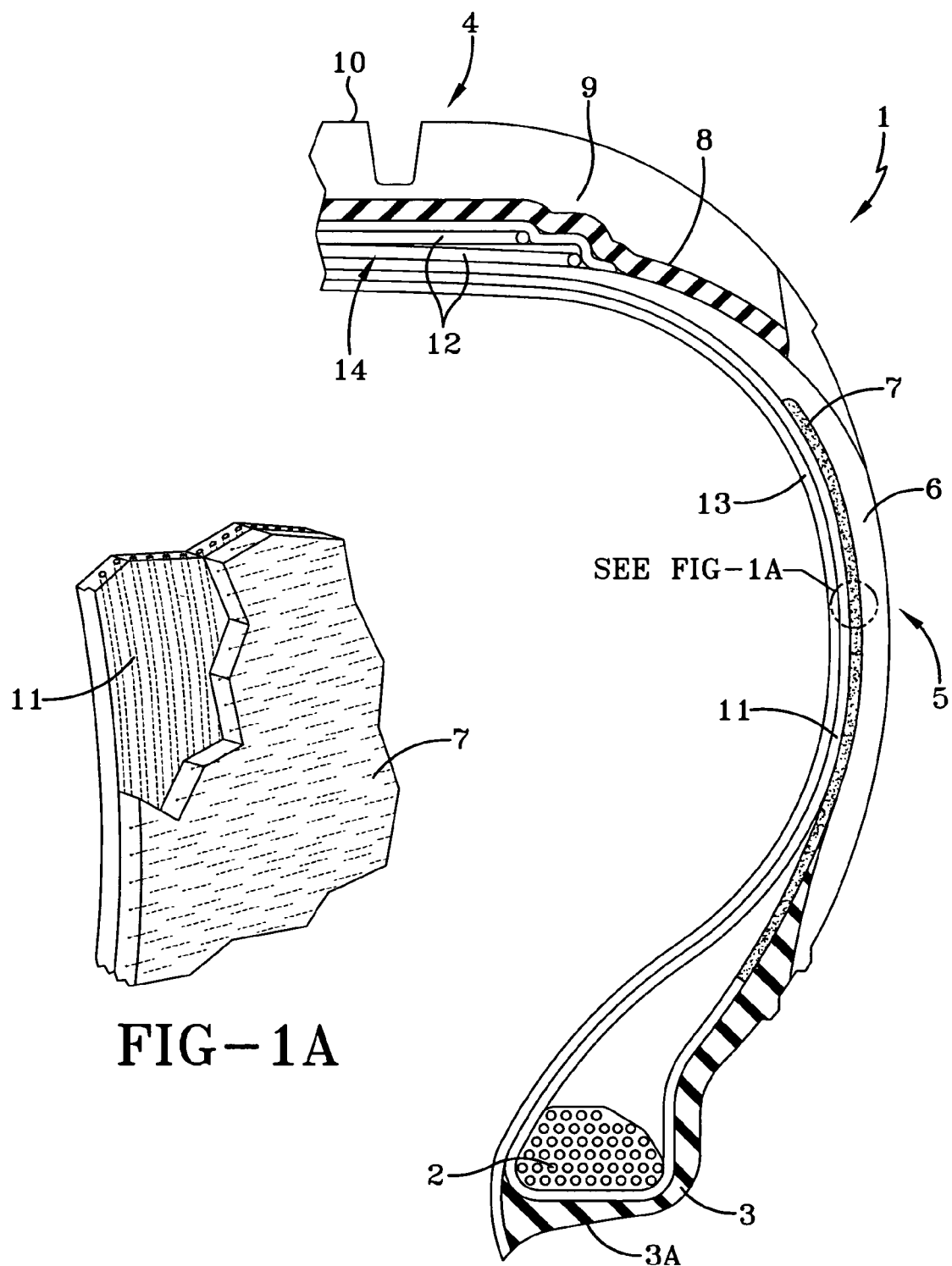

TIRE WITH PUNCTURE RESISTANT SIDEWALL

The Applicants hereby incorporate by reference prior U.S. Provisional Application Ser. No. 60/612,541, filed on Sep. 23, 2004.

FIELD OF THE INVENTION

This invention relates to a pneumatic rubber tire having a puncture resistant rubber sidewall. The said tire sidewall is comprised of an outer, visible annular configured sidewall rubber layer and an inner (non-visible) annular configured sidewall rubber layer integral with and underlying said outer sidewall rubber layer, wherein said inner sidewall rubber layer contains a dispersion of short fibers, wherein said short fibers are substantially aligned in parallel relationship to each other and substantially parallel to the said annular configuration of said inner sidewall rubber layer. In a further aspect of the invention, said tire is comprised of a carcass which contains a rubber carcass ply comprised of a rubber encapsulated cord reinforcement of a plurality of cords wherein said cords are positioned in a radially disposed spaced apart substantially parallel relationship to each other, wherein said rubber carcass ply is integral with and underlies said inner rubber sidewall layer and wherein said short fibers of said inner rubber sidewall layer are substantially aligned in a perpendicular direction to said cords of said underlying carcass ply.

BACKGROUND OF THE INVENTION

A significant typical weakness of sidewalls of pneumatic rubber tires is a relative lack of resistance to various puncturing objects. Such tire sidewalls, particularly for passenger tires, are composed of cord reinforced rubber plies of the tire carcass itself with a relatively thin visible outer rubber layer. Such sidewalls are particularly thin, as compared to the tire tread, in order promote their necessary relative flexibility and to reduce internally generated heat buildup as the tire is being run and its sidewalls subjected to a considerable dynamic flexing.

Accordingly, it is desired to provide a pneumatic rubber tire with a sidewall having a degree of resistance to being punctured with various foreign objects.

In the description of this invention, the term "phr" relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated. The term "carbon black" is used to refer to rubber reinforcing carbon blacks unless otherwise indicated. Exemplary rubber reinforcing carbon blacks may be referred to, for example, in *The Vanderbilt Rubber Handbook* (1987) on Pages 414 through 417.

Disclosure and Practice of the Invention

In accordance with this invention, a pneumatic rubber tire is provided having rubber sidewall comprised of:

(A) an outer, visible annular configured sidewall rubber layer comprised of at least one conjugated diene-based elastomer, and (B) an inner (non-visible) annular configured sidewall rubber layer integral with and underlying said outer sidewall rubber layer;

wherein said inner sidewall rubber layer is comprised of at least one conjugated diene-based elastomer and contains a dispersion of short fibers, wherein said short fibers are substantially aligned in parallel relationship to each other and substantially parallel to the said annular configuration of said inner sidewall rubber layer.

In further accordance with this invention, the pneumatic tire is provided having a rubber sidewall comprised of, based upon parts by weight per 100 parts by weight rubber (phr):

(A) an outer, visible annular configured sidewall rubber layer which comprises, based upon parts by weight per 100 parts by weight rubber (phr):
  (1) conjugated diene-based elastomers comprised of:
    (a) about 40 to about 80, preferably from about 45 to about 70, phr of cis 1,4-polyisoprene rubber, preferably natural rubber,
    (b) about 20 to about 60, preferably from about 30 to about 55, phr of cis 1,4-polybutadiene rubber,
    (c) optionally from zero to about 30, alternately from about 5 to about 20, phr of styrene/butadiene copolymer rubber;
  (2) about 55 to about 80 phr of reinforcing filler as:
    (a) about 5 to about 40 phr of rubber reinforcing carbon black having an Iodine value (ASTM D1510) in a range of from about 30 to about 90 g/kg and a dibutylphthalate (DBP) value (ASTM D2414) value in a range of from about 70 to about 130 cc/100 g, and
    (b) about 10 to about 70 phr of synthetic amorphous precipitated silica, (wherein the weight ratio of said precipitated silica to said rubber reinforcing carbon black is preferably in a range of from about 0.8/1 to about 1.5/1), and
  (3) a coupling agent for said precipitated silica having a moiety reactive with hydroxyl groups (e.g. silanol groups) contained on said precipitated silica and another moiety interactive with said conjugated diene-based elastomers.

(B) an inner (non-visible) annular configured sidewall rubber layer integral with and underlying said outer sidewall layer which comprises, based upon parts by weight per 100 parts by weight rubber (phr):
  (1) conjugated diene-based elastomers comprised of:
    (a) about 40 to about 80, preferably from about 45 to about 70, phr of cis 1,4-polyisoprene rubber, preferably natural rubber,
    (b) about 20 to about 60, preferably from about 30 to about 55, phr of cis 1,4-polybutadiene rubber,
    (c) optionally from zero to about 30, alternately from about 5 to about 20, phr of styrene/butadiene copolymer rubber;
  (2) about 55 to about 80 phr of reinforcing filler as:
    (a) about 5 to about 40 phr of rubber reinforcing carbon black having an Iodine value (ASTM D 1510) in a range of from about 30 to about 90 g/kg and a dibutylphthalate (DBP) value (ASTM D2414) value in a range of from about 70 to about 130 cc/100 g, and
    (b) about 10 to about 70 phr of synthetic amorphous precipitated silica, (wherein the weight ratio of said precipitated silica to said rubber reinforcing carbon black is preferably in a range of from about 0.8/1 to about 1.5/1);
  (3) a coupling agent for said precipitated silica having a moiety reactive with hydroxyl groups (e.g. silanol groups) contained on said precipitated silica and another moiety interactive with said conjugated diene-based elastomers, and (4) a dispersion therein of short fibers in a range of about 1 to about 12 phr thereof, wherein said short fibers are preferably comprised of at least one of aramid and nylon filaments, preferably at least one aramid filament.

wherein said short fibers are substantially aligned in a parallel relationship to each other and substantially parallel to said annular configuration of said inner sidewall rubber layer.

Said short fibers may have an average length, for example, of less than 0.5 millimeters (mm).

An important aspect of the invention is the provision of an inner layer of the oriented fiber reinforced rubber underlying and integral with (in a sense of being co-cured with in a suitable tire mold) the outer, visible rubber sidewall layer to enhance the tire sidewall's penetration resistance (e.g. puncture resistance by an impacting foreign object).

In a further aspect of the invention, said tire is comprised of a carcass which contains a rubber carcass ply comprised of a rubber encapsulated cord reinforcement of a plurality of cords wherein said cords are positioned in a radially disposed (the cords extend in a radial direction outward from the bead portion of the tire to its circumferential tread), spaced apart substantially parallel relationship to each other, wherein said rubber carcass ply is integral with and underlies said inner rubber sidewall layer and wherein said short fibers of said inner rubber sidewall layer are substantially aligned in a perpendicular direction to said cords of said underlying carcass ply.

A further significant aspect of the invention is therefore the orientation of the inclusion of said short fibers in the said rubber layer positioned within the tire sidewall which overlies a tire carcass ply in a manner that the oriented short fibers are as a right angle (90 degree angle) to the direction of the carcass ply cord in a manner that further enhances the tire sidewall's penetration resistance (e.g. puncture resistance by an impacting foreign object).

In practice, said carcass ply rubber composition may be comprised of, for example, based upon parts by weight per 100 parts by weight rubber (phr):

(A) at least one conjugated diene-based elastomer comprised of, for example, about 60 to about 80 phr of cis 1,4-polyisoprene rubber and about 20 to about 40 phr of styrene/butadiene copolymer rubber, and (B) particulate filler reinforcement comprised of from about 45 to about 65 phr of rubber reinforcing carbon black and, optionally, from about 2 to about 15 phr of precipitated silica;

wherein said cord reinforcement is comprised of at least one filament comprised of at least one of aramid, nylon and polyester filaments.

Representative conventional rubber reinforcing carbon blacks are various rubber reinforcing carbon blacks referenced, for example, in *The Vanderbilt Rubber Handbook*, (1978), Page 417, according their ASTM designated "N" number with associated Iodine values and DBP values.

Representative of rubber reinforcing carbon blacks having an Iodine value in a range of from about 30 to about 90 g/kg and a DBP value in a range of from about 70 to about 130 cc/100 g are, for example and according to their ASTM designations, N326, N330, N351, N650 and N660.

The precipitated silicas are in a form of aggregates thereof which may be obtained, for example, by the acidification of a soluble silicate, e.g., sodium silicate or a co-precipitation of a silicate and an aluminate with an inclusion of a suitable electrolyte to promote formation of silica aggregates.

The BET surface area of the silica, as measured using nitrogen gas, may, for example, be in a range of about 50 to about 300, alternatively about 120 to about 200, square meters per gram.

A method of measuring BET (nitrogen) surface area of precipitated silicas is ASTM D-1993-91, *Standard Test Method for Precipitated Silica-Surface Area by Multipoint BET Nitrogen Adsorption* which relates to the conventional theory described by Brunauer, Emmett and Teller in the *Journal of the American Chemical Society*, Volume 60, (1938), Page 309.

The silica may also have a dibutylphthalate (DBP) absorption value, for example, in a range of about 100 to about 400, and for this invention usually about 125 to about 200 $cm^3/100$ g.

Various commercially available silicas may be considered for use in this invention such as, for example, only and without limitation, silicas commercially available from PPG Industries under the Hi-Sil trademark with designations 210, 243, etc; silicas available from Rhodia, with such as for example of Zeosil 1165MP™ and Zeosil165GR™ and silicas available from Degussa AG with designations VN2™ and VN3™, 3770GR™ and from Huber such as for example Zeopol 8745™.

The silica reinforcement is conventionally used with a coupling agent which also aids in coupling the silica to the diene-based elastomer(s) by reaction of, for example, an alkoxysilane moiety contained in the coupling agent with hydroxyl groups (e.g. silanol groups) contained on the silica's surface and by interaction of another moiety of the coupling agent with the diene-based elastomer(s).

Compounds, or materials, capable of reacting with the silica and the rubber elastomer molecule in a manner to cause the silica to have a reinforcing effect on the rubber, are often generally known to those skilled in such art as coupling agents, or couplers. Such coupling agents, for example, may be premixed, or pre-reacted, with the silica particles or added to the rubber mix during the rubber/silica processing, or mixing, stage. If the coupling agent is added to the rubber mixture during a rubber mixing stage separately from the silica it is considered that the coupling agent then combines in situ within the rubber host with the silica.

In particular, as hereinbefore discussed, such coupling agents may, for example, be composed of a silane which has a constituent component, or moiety, (e.g. an alkoxysilane portion) capable of reacting with the silica (e.g. hydroxyl groups on the surface of the silica) and also a constituent component, or moiety, capable of interacting with the rubber, particularly a sulfur vulcanizable diene-based rubber which contains carbon-to-carbon double bonds, or unsaturation. In this manner, then the coupler acts as a connecting bridge between the silica and the diene-based rubber and thereby enhances the rubber reinforcement aspect of the silica and exfoliated clay platelets. Such interaction is well known to those having skill in such art.

In one aspect, the silane, particularly an alkoxysilane component, of the coupling agent apparently forms a bond to the silica surface, possibly through hydrolysis, and the rubber interactive component (e.g. sulfur) of the coupling agent combines with the rubber itself.

Numerous coupling agents may be used, including usually those taught for use in combining silica and rubber such as, for example, silane (e.g. alkoxysilane) based coupling agents containing a polysulfide component, or structure, such as bis-(3-alkoxysilylalkyl) polysulfide which contains primarily from 2 to 6 sulfur atoms in its polysulfidic bridge with an average of from 2 to 4, alternately an average of from 2 to 2.6 or an average of from 3.5 to about 4, preferably an average of from 2 to 2.6, connecting sulfur atoms in its polysulfidic bridge such as, for example, a bis-(3-triethoxysilylpropyl) polysulfide.

Thus, a contemplated coupling agent is a bis-(3-ethoxysilylpropyl) polysulfide material having from 2 to 6, with an average, for example, of from 2 to 2.6 connecting sulfur atoms in the polysulfide bridge. Such coupling agent is often preferred, as compared to such a coupling agent having a significantly higher average of from 3 to 4 connecting sulfur atoms in its polysulfidic bridge, in order to provide enhanced ease of processing, particularly mixing, the unvulcanized rubber composition.

However, as also hereinbefore discussed, a coupling agent may be used which contains an alkoxysilane moiety for reaction with hydroxyl groups contained on the silica (e.g. silanol groups) if silica is used, and a mercapto functionality, or moiety, for interaction with the diene-based elastomer(s).

Representative of such coupling agent is, for example, a siloxyorganomercapto alkoxysilane such as for example, mercaptopropyl triethoxysilane. Alternately, such coupling agents with a mercapto functionality, or moiety, may be used in which the mercapto functionality, or moiety, has been blocked by a moiety which is itself labile and in which the blocked mercapto functionality may be deblocked under the rubber vulcanization conditions of elevated temperature to provide the rubber reactive mercapto functionality. Thus an appropriate alkoxyorganomercaptosilane such as, for example, mercaptopropyltriethoxysilane, with its mercapto group blocked by such a moiety (organomercaptotrialkylsilane, or mercaptopropyl triethoxysilane having a blocked mercapto moiety with a moiety which capable of being deblocked at an elevated temperature) may be used for which its mercapto moiety is then deblocked during vulcanization of the associated rubber composition at an elevated temperature such as, for example, a temperature in a range of from about 140° C. to about 160° C. For example, see U.S. Pat. Nos. 6,127,468, 6,204,339, 6,414,061, 6,528,673 and 6,608,125 which are incorporated herein in their entirety.

Additionally, the coupling agent may be used as an additive for in situ reaction with the hydroxyl group-containing fillers, namely the partially exfoliated, intercalated, clay particles, as well as amorphous silica if used, or as a pre-reaction modifier to such fillers, and may be comprised of an alkoxy silane or haloalkyl silane in combination with the aforesaid polysulfidic organoalkoxysilanes or organomercapto alkoxysilanes. The alkoxy silanes and haloalkyl silanes, while not coupling agents themselves, may react with the hydroxyl groups of the silica to supplement the coupling performance of the polysulfidic organosilanes or organomercaptosilanes.

Alternately, said amorphous silica may be provided as a pre-formed reaction product, prior to introduction to, or mixing with, the elastomer(s), of precipitated silica which contains hydroxyl groups on its surface and the coupling agent as a co-reactant.

In such manner and in one aspect for example, the amorphous silica may be provided as a pre-formed reaction product of precipitated silica and a co-reactant as polysulfidic organosilane as a bis(3-alkoxysilylalkyl) polysulfide, and particularly a bis(3-triethoxysilylpropyl) polysulfide, having an average of from about 2 to about 4 connecting sulfur atoms in its polysulfidic bridge.

In another aspect, the amorphous silica may be provided as a pre-formed reaction product of precipitated silica and a co-reactant as an organomercapto alkoxysilane or organomercapto alkoxysilane in which its mercapto functionality has been blocked by a moiety which is capable of being deblocked during vulcanization of the associated rubber composition at an elevated temperature such as, for example, a temperature in a range of from about 140° C. to about 160° C.

In a further aspect, the amorphous silica may be provided as a pre-formed reaction product of precipitated silica and a co-reactant as a combination of said bis(3-trialkoxysilylalkyl) polysulfide or organomercapto allkoxysilane with an alkoxysilane or haloalkyl silane.

Further, the amorphous silica may be provided as a pre-formed reaction product of a precipitated silica and a co-reactant as a combination of alkoxy silane or haloalkyl silane with an organomercapto alkoxysilane in which its mercapto functionality has been blocked by a moiety which is capable of being deblocked during vulcanization of the associated rubber composition at an elevated temperature such as, for example, a temperature in a range of from about 140° C. to about 160° C.

In practice, said alkoxy alkylsilane may, for example, be represented as the general formula (I):

$$(RO)_n-Si-R^1_{4-n} \qquad (I)$$

where R is selected from methyl and ethyl radicals, $R^1$ is an alkyl radical containing from one to twenty carbon atoms and n is a value of from 1 to and including 3.

In practice, said haloalkyl silane may, for example, be represented as the general formula (II):

$$(X)_n-Si-R^1_{4-n} \qquad (II)$$

where X is a halogen selected from chlorine or bromine and $R^1$ is an alkyl radical containing from one to twenty carbon atoms.

In practice, said alkoxyorganomercaptosilane may, for example, be represented as the general formula (III):

$$(RO)_3-Si-R^2-SH \qquad (III)$$

where R is selected from methyl and ethyl radicals and $R^2$ is an alkylene radical containing from one to six, preferably three, carbon atoms.

BRIEF DESCRIPTION OF THE DRAWINGS

Drawings are provided herewith as FIG. 1 and FIG. 1A. FIG. 1 depicts a cross-section of a portion of an open toroidally shaped pneumatic tire and FIG. 1A depicts an expanded view of an indicated portion of FIG. 1.

THE DRAWINGS

Referring to both FIG. 1 and FIG. 1A, a cross-sections of an open toroidally shaped tire (1) are presented with two spaced apart bead components (2), a rubber chafer (3) as a part of the overall bead portion of the tire with a tire mounting surface designed to contact a rigid metal wheel rim (not shown) onto which the tire is to be mounted to form a tire/rim assembly and thereby create an enclosed, air-containing cavity, a circumferential rubber tread (4) of a cap/base construction, rubber sidewalls (5) extending radially outward from said bead (2) and chafer (3) components to and connecting with the peripheral edges of the tread (4) of the tire (1), together with one or more cord reinforced rubber plies (11), extending between said bead components (2) and which supports the sidewalls (5) and ultimately the circumferential tread (4).

In the drawings, the tire sidewall (5) has an outer visible rubber layer (6) and an underlying rubber strip (7) positioned within said sidewall (5) extending from the chafer component (3) to and connecting with a tread base layer (8) of said tread (4) and exclusive of the outer, exposed surface of the outer sidewall layer (6) which is juxtapositioned to at least a portion of said outer sidewall layer (6).

For the drawings, the outer sidewall layer (6) is of a rubber composition comprised of cis 1,4-polybutadiene and cis 1,4-polyisoprene elastomers together with reinforcing filler as a rubber reinforcing carbon black.

The underlying internal rubber layer (7) which underlies said outer sidewall layer (6) is comprised of cis 1,4-polybutadiene and cis 1,4-polyisoprene, a reinforcing filler as a rubber reinforcing carbon back and a dispersion therein of short aramid fibers which are substantially aligned in a parallel direction to each other and in a annular direction in the underlying sidewall rubber layer (7).

Accordingly, it is seen herein that said internal, underlying rubber layer (7) provides a penetration barrier within the tire sidewall to retard, delay and/or prevent a penetration of the tire sidewall with a foreign puncturing object and to thereby support the said outer sidewall layer (6) to promote a resistance to various puncturing objects for the sidewall itself.

The internal rubber layer trip (7) does not physically extend to and is therefore exclusive of and not a part of, the visible tire sidewall outer surface. In practice, it is also preferred that the internal rubber layer (7) does not physically extend to a wheel-rim accepting surface of the tire itself.

In FIG. 1A, a sectional view of the tire (1) is presented in which includes a portion of the tire carcass ply (11) which is composed of rubber encapsulated cord reinforcement of a plurality of cords (13) wherein said cords (13) positioned in a radially disposed spaced apart substantially parallel relationship to each other, wherein said rubber carcass ply is integral with and underlies said inner rubber sidewall layer (6) and wherein said short fibers of said inner rubber sidewall layer (6) are substantially aligned in a perpendicular direction to said cords of said underlying carcass ply.

It is readily understood by those having skill in the art that the rubber compositions of the respective components of the tire (e.g. said outer rubber sidewall layer and said underlying sidewall layer as well as the tire carcass ply) would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, and plasticizers, fillers, pigments, fatty acid, zinc oxide, waxes, antioxidants and antiozonants and reinforcing materials such as, for example, the hereinbefore discussed carbon black and silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 20 phr. Such processing aids are intended to exclude, or at least substantially exclude aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amount (0.5 to 2 phr), and a secondary accelerator which is generally used in smaller amounts (0.05 to 0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention unless otherwise indicated.

Sometimes one or more of the antioxidants and antiozonants may be more simply referred to as antidegradants.

The tire can be built, shaped, molded and cured by various methods which will be readily apparent to those having skill in such art.

The prepared tire of this invention is conventionally shaped and cured by methods known to those having skill in such art.

The following example is provided to further illustrate a portion of the invention. The parts and percentages are by weight unless otherwise indicated.

Example I

Rubber samples, referred to herein as Control Sample A and Sample B, are prepared as a proposed composition for an outer, visible sidewall layer (Sample A) and underlying internal sidewall layer (to underlie said outer sidewall layer) which contains short aramid fibers (Sample B) for a pneumatic tire.

The short aramid fibers in Sample B were obtained as a pre-rubber blend which was, in turn, used to form the Sample B and were substantially aligned in parallel relationship to each by the processing of Rubber Sample B sample by calendering through open rolls, a rubber processing procedure well known to those having skill in such art.

The compositions of Sample A and Sample B illustrated in the following Table 1 with the parts and percentages by weight unless otherwise indicated.

The ingredients were mixed in an internal rubber mixer as a first non-productive mixing step, to the exclusion of sulfur and vulcanization accelerator, to a temperature of about 160° C., dumped from the mixer, sheeted out from an open roll mill and allowed to cool below 40° C. and than mixed in a productive mixing step, in which sulfur and vulcanization accelerator(s) are added, to a temperature of about 110° C. The use of sequential non-productive and productive mixing steps are well known to those having skill in such art.

TABLE 1

|  | Control | |
|---|---|---|
|  | Sample A | Sample B |
| First Non-Productive Mixing Step | | |
| Cis 1,4-polybutadiene rubber[1] | 60 | 60 |
| Natural rubber[2] | 40 | 40 |
| Short fibers2 | 0 | 12 |
| Carbon black (N550)[3] | 51 | 30 |
| Fatty Acid[4] | 1 | 1.5 |
| Antidegradants[5] | 3 | 0 |
| Rubber processing oil[6] | 13.6 | 6 |
| Wax[7] | 1 | 1.2 |
| Zinc oxide | 2 | 2.5 |
| Productive Mixing Step | | |
| Sulfur | 1.5 | 1.5 |
| Accelerator(s)[8] | 0.8 | 1.5 |

[1] Obtained as BUD1207 ™ from The Goodyear Tire & Rubber Company
[2] Blend of about 77 weight percent natural cis 1,4-polyisoprene rubber and about 23 weight percent Kevlar ™ aramid fibers, wherein the aramid fibers are understood to have an average length of less than 0.5 mm, reported in Table 1 as 40 parts by weight natural rubber and 12 parts by weight aramid fibers, obtained as Merge IF722 ™ from the DuPont de Numours Co.
[3] Rubber reinforcing carbon black as N550, an ASTM designation
[4] Primarily stearic acid
[5] Of the amine type
[6] Naphthenic/paraffinic medium rubber processing oil
[7] Paraffinic and microcrystalline waxes
[8] Sulfenamide and guanidine based sulfur cure accelerators The rubber Control Sample A and Sample B were evaluated for various physical properties and reported in the following Table 2 and Table 3. For the cured properties, the Samples were cured at a temperature of about 170° C. for about 6 minutes.

In particular the unvulcanized Samples were evaluated for their respective green strengths in a sense of their maxim elongations (at break) maximum strengths (at break) both with the grain and against the grain of the respective Samples. The "grain" of the Samples is readily visible and not dependent upon the presence of the short fibers, because of the calendering method of preparation of the samples which would be understood by one having skill in such art. However, the oriented short fibers in Sample B would be primarily oriented in the direction of the grain of the Sample. These values are reported in Table 2.

The vulcanized Samples were also evaluated for their respective storage modulus (G') and their loss modulus (G") properties and also reported in Table 2.

The vulcanized Samples were further evaluated for their respective penetration resistance which is additionally reported in the following Table 3.

TABLE 2

|  | Samples | |
|---|---|---|
|  | Control Sample A | Sample B |
| Short aramid fiber content | 0 | 12 |
| Properties | | |
| Green Strength of Uncured Samples Maximum Elongation (strain)[1] | | |
| With the grain (%) | 1149 | 168 |
| Against the grain (%) | 1598 | 450 |
| Ratio of with/against the grain | 0.72/1 | 0.37/1 |
| Maximum Strength[1] | | |
| With the grain (MPa) | 0.166 | 3.147 |
| Against the grain (MPa) | 0.095 | 0.788 |
| Ratio of with/against the grain | 1.75/1 | 3.99/1 |
| Cured Properties | | |
| Storage Modulus (G'), RSA, 25° C., at 2% Strain, 11 Hertz[2] | | |
| With the grain (MPa) | 3.36 | 13.3 |
| Against the grain (MPa) | 2.38 | 5.11 |
| Ratio of with/against the grain | 1.41/1 | 2.6/1 |
| Loss Modulus (G"), RSA, 25° C. at 2% Strain, 11 Hertz[2] | | |
| With the grain (MPa) | 0.705 | 2.31 |
| Against the grain (MPa) | 0.494 | 0.851 |
| Ratio of with/against the grain | 1.43/1 | 2.73/1 |

[1] Determined by an Instron ™ tensile testing instrument at a speed of 508 mm/min and an initial jaw separation of 25.4 mm with the resulting ultimate elongation and ultimate tensile strength of the unvulcanized rubber samples being reported in terms of percent and MPa, respectively. ASTM D6746 procedure may be reviewed in a sense of a general informational reference.
[2] Determined by a Rheometrics Sample Analyzer (III) (referred to herein as an RSA analytical instrument). The uncured Samples were tested using a temperature sweep at 11 Hertz (Hz) to obtain the dynamic loss modulus (G') and the dynamic storage modulus (G") values at 25° C. in units of MPa. ASTM D5992 procedure may be reviewed in a sense of a general informational reference.

From Table 2 it can be seen that the maximum elongation (until sample break) decreased significantly for Sample B, which contained the oriented dispersion of aramid fibers, as compared to Control Sample A, namely by a factor of at least 6/1 with the grain and by a factor of almost 4/1 against the grain of the respective sample.

From Table 2 it can also be seen that the maximum strength (until sample break) increased significantly for Sample B, which contained the oriented dispersion of aramid fibers, as compared to Control Sample A, namely by a factor of almost 19/1 with the grain and by a factor of almost 8/1 against the grain of the respective sample.

This is considered herein to be significant because the results verify the significance of providing the oriented aramid fibers to significantly strengthen the cured rubber sample.

It can further be seen in Table 2 it can be seen that the dynamic storage modulus (G') increased significantly for Sample B, which contained the dispersion of aramid fibers, as compared to Control Sample A, namely by a factor of almost 4/1 with the grain and by a factor of about 2/1 against the grain.

It can additionally be seen in Table 2 it can also be seen that the dynamic loss modulus (G") increased significantly for Sample B, which contained the dispersion of aramid fibers, as compared to Control Sample A, namely by a factor of at least 3/1 with the grain and by a factor of about 1.7/1 against the grain.

This is considered herein to be significant because the results further verify the significance of providing the oriented aramid fibers to significantly strengthen the cured rubber sample.

Therefore, it is considered herein that sidewall laminate composed of an outer visible layer as rubber Sample A combined with an integral underlying internal rubber layer of rubber Sample B can provide a pneumatic tire sidewall with a significantly increased strength, whether of not in the direction of the oriented fibers, although particularly in the direction of the oriented fibers.

The Samples were further evaluated for energy to penetrate rubber samples comprised of a Control Rubber Block W of a rubber composition of aforesaid Sample A and of Rubber Blocks X, Y and X which were individually composed of 3, 6 and 12 thin layers of oriented short aramid fiber containing rubber Sample B (the thin layers having an individual thickness of about 0.5 mm) sandwiched between layers of a rubber composition of rubber Sample A. The rubber sample blocks had an overall dimension of 25 mm thickness, 25 mm width and 50 mm length.

The results of penetration energy tests are reported in the following Table 3.

TABLE 3

| Penetration Energy | Sample B |
|---|---|
| Rubber Block W | |
| Penetration Energy, Containing Zero Layers of Rubber | |
| 5 mm penetration energy (joules) | 0.064 |
| 10 mm penetration energy (joules) | 0.459 |
| 15 mm penetration energy (joules) | 1.361 |
| 20 mm penetration energy (joules) | 2.837 |
| Rubber Block X | |
| Penetration Energy, Containing 3 Layers of Rubber | |
| 5 mm penetration energy (joules) | 0.115 |
| 10 mm penetration energy (joules) | 0.849 |
| 15 mm penetration energy (joules) | 2.164 |
| 20 mm penetration energy (joules) | 3.456 |
| Rubber Block Y | |
| Penetration Energy, Containing 6 Layers of Rubber | |
| 5 mm penetration energy (joules) | 0.1763 |
| 10 mm penetration energy (joules) | 1.061 |
| 15 mm penetration energy (joules) | 2.535 |
| 20 mm penetration energy (joules) | 4.130 |
| Rubber Block Z | |
| Penetration Energy, Containing 12 Layers of Rubber | |
| 5 mm penetration energy (joules) | 0.192 |
| 10 mm penetration energy (joules) | 1.249 |
| 15 mm penetration energy (joules) | 2.792 |
| 20 mm penetration energy (joules) | 4.659 |

[1]Penetration Test preformed by an Instron™ test instrument using a 0.5 cm diameter cylindrical rod with a pointed end which was used to penetrate the respective samples to a pre-determined depth with a crosshead speed of 100 mm/minute From Table 3 it can be seen that the energy used to penetrate depths of 5, 10, 15 and 20 mm of the respective sample rubber Blocks X, Y and Z containing the associated layers of oriented aramid fiber-containing rubber Sample B increased significantly, namely about 80, 80, 60 and 20 percent, respectively, as compared to Control Rubber Block W which did not contain a layer of rubber Sample B with the included oriented aramid fiber dispersion.

Accordingly, it is considered herein that a tire rubber sidewall which contains an inner layer of oriented aramid fiber containing rubber Sample B which underlies and is integral with an outer, visible rubber sidewall layer which does not containing the oriented aramid fiber dispersion has a significantly increased penetration resistance (resistance to penetration through the tire sidewall and particularly the aforesaid inner rubber layer containing the dispersion of oriented aramid short fibers than a similar rubber sidewall layer which does not contain the aramid fiber dispersion.

From Table 3 it can also be seen that the energy used to penetrate depths of 5, 10, 15 and 20 mm the sample rubber Block Y containing 6 layers of the oriented aramid fiber-containing rubber Sample B, as well as sample rubber Block Z containing 12 layers of the rubber Sample B, increased significantly over the energy used to penetrate 5, 10, 15 and 20 mm, respectively, of the sample rubber Block X containing 3 layers of rubber Sample B.

Accordingly, it is considered herein that the energy to penetrate the rubber Blocks X, Y and Z which contained the sandwiched layer(s) of rubber Sample B with its included dispersion of the aramid fibers increased significantly somewhat in proportion the number of layers of rubber Sample B and that a tire sidewall having multiple layers of rubber Sample B would have a significantly progressively increased resistance to penetration.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber sidewall comprised of, based upon parts by weight per 100 parts by weight rubber (phr):
   (A) an outer, visible annular configured sidewall rubber layer which comprises, based upon parts by weight per 100 parts by weight rubber (phr):
      (1) conjugated diene-based elastomers comprised of:
         (a) about 40 to about 80 phr of cis 1,4-polyisoprene rubber,
         (b) about 20 to about 60 phr of cis 1,4-polybutadiene rubber,
         (c) from zero to about 30 phr of styrene/butadiene copolymer rubber;
      (2) about 55 to about 80 phr of reinforcing filler as:
         (a) about 5 to about 40 phr of rubber reinforcing carbon black having an Iodine value in a range of from about 30 to about 90 g/kg and a dibutylphthalate (DBP) value in a range of from about 70 to about 130 cc/100 g, and
         (b) about 15 to about 70 phr of synthetic amorphous precipitated silica, and
      (3) a coupling agent for said precipitated silica having a moiety reactive with hydroxyl groups contained on said precipitated silica and another moiety interactive with said conjugated diene-based elastomers;
   (B) an inner non visible annular configured sidewall rubber layer integral with and underlying said outer sidewall layer where said inner sidewall rubber layer is comprised of multiple separate adjoining thin layers of a rubber composition which comprises, based upon parts by weight per 100 parts by weight rubber (phr):
      (1) conjugated diene-based elastomers consisting of:
         (a) about 40 to about 80 phr of cis 1,4-polyisoprene rubber, and
         (b) about 20 to about 60 phr of cis 1,4-polybutadiene rubber;
      (2) about 55 to about 80 phr of reinforcing filler consisting of:
         (a) about 5 to about 40 phr of rubber reinforcing carbon black having an Iodine value in a range of from about 30 to about 90 g/kg and a dibutylphthalate (DBP) value in a range of from about 70 to about 130 cc/100 g, and
  (b) about 15 to about 70 phr of synthetic amorphous precipitated silica,
(3) a coupling agent for said precipitated silica having a moiety reactive with hydroxyl groups contained on said precipitated silica and another moiety interactive with said conjugated diene-based elastomers, and
(4) a dispersion therein of short fibers in a range of about 1 to about 12 phr thereof, wherein said short fibers have an average length of less than 0.5 millimeters (mm) consisting of aramid filaments;
wherein said short fibers are substantially aligned in a parallel relationship to each other and substantially parallel to said annular configured inner sidewall rubber layer, and
wherein said tire further is comprised of a carcass which contains a rubber carcass ply comprised of a rubber encapsulated cord reinforcement of a plurality of cords, wherein said cords extend in a radial direction outward from a bead portion of the tire to its circumferential tread, wherein said cords are spaced apart in a substantially parallel relationship to each other, wherein said rubber carcass ply is integral with and underlies said inner rubber sidewall layer and where said short fibers of said inner rubber sidewall layer are substantially aligned in a perpendicular direction to said cords of said underlying carcass ply.

2. The pneumatic tire of claim 1 wherein said inner non visible annular configured sidewall rubber layer is comprised of at least three of said thin separate adjoining layers of said rubber composition.

3. The pneumatic tire of claim 1 wherein said inner non visible annular configured sidewall rubber layer is comprised of from about 3 to about 12 of said thin separate adjoining layers of said rubber composition.

* * * * *